US006627316B1

(12) United States Patent
Matsuki et al.

(10) Patent No.: US 6,627,316 B1
(45) Date of Patent: Sep. 30, 2003

(54) RESIN COMPOSITION FOR WATER BORNE COATINGS AND WATER BORNE COATING COMPOSITION

(75) Inventors: Hiroyasu Matsuki, Hiratsuka; Reijirou Nishida, Chigasaki; Tohru Iwamoto, Atsugi; Atsushi Shioda, Yokohama, all of (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/817,955

(22) Filed: Mar. 27, 2001

(30) Foreign Application Priority Data

Mar. 27, 2000 (JP) ............................................ 12-086892

(51) Int. Cl.$^7$ ............................................. B32B 27/38
(52) U.S. Cl. ..................... 428/413; 523/406; 523/409; 525/329.5; 525/329.7; 525/379
(58) Field of Search ................................ 523/406, 409; 428/413; 525/329.5, 329.7, 379

(56) References Cited

U.S. PATENT DOCUMENTS

| 4,302,373 A | * 11/1981 | Steinmetz .................... 523/409 |
| 5,270,356 A | 12/1993 | Katamoto et al. |
| 5,767,175 A | 6/1998 | Kamekura et al. |
| 5,840,384 A | 11/1998 | Noda et al. |
| 6,069,187 A | 5/2000 | Kusumoto |

* cited by examiner

Primary Examiner—Robert Dawson
Assistant Examiner—D. Aylward
(74) Attorney, Agent, or Firm—Huntley & Associates

(57) ABSTRACT

A resin composition, which is obtained by quaternary salt-formation reaction, in the presence of a tertiary amine, of a copolymer and an amine-modified epoxide resin. Also disclosed herein is a water-borne coating comprising the resin. The coating composition can form superior coating film in surface appearance, adhesion, fabrication, coating film hardness, yellowing resistance and retort resistance, and has good coatability, and low organic solvent content.

22 Claims, No Drawings

RESIN COMPOSITION FOR WATER BORNE COATINGS AND WATER BORNE COATING COMPOSITION

BACKGROUND OF THE INVENTION

The present invention relates to resin compositions for use in water borne coatings and a water borne coating composition comprising such resin compositions which is particularly suitable for coating the external surface of cans, and provides a coating having superior smoothness and gloss, as well as superior adhesion, film hardness, resistance to yellowing, and ease of fabrication. The present invention also relates to a method of coating film formation with the use of this water borne coating composition.

Cans, and those made from metal and alloys thereof, can be used as vessels containing various food and drink products. The external surface of such metal cans can be coated with white paints, which can be printed on with ink of a different color, and then finished by clear coating the ink imprinted white paint to prevent corrosion and protect the underlying coating, which can include product information as well as ingredient lists and trademarks or other sales related printing.

Previously, organic solvent solutions having acryl/amino resin, polyester/amino resin, or a resin system obtained by addition of epoxide resin to these resins were used as coating compositions for this kind of painting on cans. However, these coating compositions require a large quantity of solvent, resulting in vaporization when baking the coating film, an important factor of air pollution. More recently, water borne coating compositions for coating the external surface of cans were developed.

Examples of well-known water-borne vinyl polymer coatings include a resin emulsion-type coating having a polymer synthesized from monomer constituent by emulsion polymerization method using a surfactant, and a coating having a resin solubilized or emulsified by neutralization of carboxyl groups introduced in a resin.

The emulsion-type resin coating contains a surfactant. There is the problem that a coating film obtained after baking becomes inferior in water resistance because the surfactant remains in the coating film. In addition, the low coating viscosity peculiar to emulsion type resins makes the coating film difficult to apply.

Similarly, in coatings having a resin solubilized or emulsified by neutralization of carboxyl groups, there is the problem that there are a limited amount of carboxyl groups that can be introduced in the resin while still providing a water resistant coating, because the carboxyl groups can be neutralized with a suitable volatile base chemical agent, and are thus changed into being water-soluble. Accordingly, the use of considerable quantities of organic solvent becomes necessary in order to provide a stable coating, and thus it is difficult to achieve a low content of organic solvent in the coating composition.

It is important for coatings for the external surface of cans to be easy to fabricate and apply. The resulting coating should exhibit superior scratch resistance, yellowing resistance, and retort resistance. Attempts have been made to utilize a copolymer resin as a base resin, providing a coating film having the above properties, but they have been unsatisfactory. For example, Japanese Patent Laid-Open No. 239404/1993 discloses a water-borne coating composition including, as a resin composition, 20–80 parts by weight of a water-soluble acrylic resin, 20–50 parts by weight of a water-soluble amino resin and 5–30 parts by weight of an amine-modified epoxy resin which is obtained by adding an amine to epoxy compounds. However, this composition fails to provide the above qualities, and exhibits the following deficiencies: cloudiness, and isolation of components in preparing a coating composition when the coating has a low organic solvent content added into this composition.

SUMMARY OF THE INVENTION

The present invention provides a resin composition and a water-borne coating composition comprising the resin composition which can solve the above problems, while providing the above desired properties, achieving a good balance of coating film properties including appearance, adhesion, fabricability, hardness, yellowing resistance and retort resistance, in addition to good coatability, and low content of organic solvent in a coating composition.

The present invention provides a resin composition for use in a water-borne coating composition, as well as a method for forming a coating film including coating the water-borne coating composition.

The present invention provides a resin composition, which is the quaternary salt-formation reaction product, in the presence of a tertiary amine, of (a) about from 50 to 90 parts by weight of a copolymer having an acid value of about from 20 to 160 mgKOH/g and (b) about from 10 to 50 parts by weight of an amine-modified epoxide resin. The invention also provides a resin composition wherein the amine-modified epoxide resin (b) is an addition reaction product of a primary or secondary amine and an epoxy resin having an epoxy equivalent of about from 150 to 1,200. In addition, the present invention provides a resin composition wherein the copolymer (a) is the copolymerization product of at least one $\alpha$, $\beta$-ethylenically unsaturated carboxylic acid and at least one radically polymerizable unsaturated monomer, the unsaturated monomer being copolymerizable with the at least one unsaturated carboxylic acid.

The present invention also comprises a water-borne coating composition comprising (A) a resin composition of Claim 1 and (B) at least one amino resin, both being dissolved or dispersed in a stable aqueous medium.

Furthermore, the present invention provides a method for forming a coating film including coating the water-borne coating composition onto an external surface of a can, and a coated substrate, such as a can.

DETAILED DESCRIPTION OF THE INVENTION

Although specific embodiments of the present invention are described in detail herein, it is to be expressly understood that the invention is not limited thereto. The following detailed description of the various preferred embodiments is provided for example only and should not be construed as constituting any limitation of the invention. Modifications will be obvious to those skilled in the art, and all modifications that do not depart from the spirit of the invention are intended to be included within the scope of the appended claims.

The resin composition of the present invention is a resin composition that can be obtained by quaternary salt-formation reaction of the following copolymer (a) and an amine-modified epoxide resin (b) in the presence of a tertiary amine.

Copolymer (a)

Copolymer (a) in the present invention is essentially based on $\alpha$, $\beta$-ethylenically unsaturated carboxylic acid as monomer constituents. The unsaturated carboxylic acid should be present in about from 2.5 to 20% by weight, preferably about from 5 to 15% by weight of the copolymer (a).

The unsaturated carboxylic acid described above can include, for example, acrylic acid, methacrylic acid, maleic acid, fumaric acid and itaconic acid.

In copolymer (a), the quantity of copolymerization of α,β-ethylenically unsaturated carboxylic acid should be sufficient to obtain a resulting copolymer (a) having an acid value of about from 20 to 160 mg KOH/g, preferably about from 40 to 120 mg KOH/g. When the acid value of copolymer (a) is less than 20 mg KOH/g, the quaternary salt-formation reaction with amine-modified epoxide resin is difficult to initiate and advance. Such a low acid value also makes it difficult to make the copolymer (a) water-borne, and diminishes the curability of the resulting coating film. When the acid value of copolymer (a) exceeds 160 mgKOH/g, water resistance, retort resistance and fabricability of the resulting coating film suffer.

Copolymer (a) should have a number average molecular weight of about from 8,000 to 25,000, preferably about from 10,000 to 20,000.

Representative examples of radically polymerizable unsaturated monomers copolymerizable with α,β-ethylenically unsaturated carboxylic acid can include C 1–24 alkyl (meth)acrylate such as methyl (meth)acrylate, ethyl (meth)acrylate, propyl (meth)acrylate, n-butyl (meth)acrylate, i-butyl (meth)acrylate, t-butyl (meth)acrylate, 2-ethylhexyl (meth)acrylate, cyclohexyl (meth)acrylate, lauryl (meth)acrylate, stearyl (meth)acrylate, cetyl (meth)acrylate; hydroxyalkyl (meth)acrylates such as 2-hydroxyethyl (meth)acrylate, hydroxypropyl (meth)acrylate, hydroxybutyl (meth)acrylate, hydroxyamyl (meth)acrylate, hydroxyhexyl (meth)acrylate; hydroxy group-containing and modified alkyl (meth)acrylate obtained by a ring-opening addition reaction of 1–5 mol of ε-caprolactone with 1 mol of the above mentioned hydroxyalkyl (meth)acrylate; acrylamide monomer such as N-methoxymethyl (meth)acrylamide, N-ethoxymethyl (meth)acrylamide, N-n-propoxymethyl (meth)acrylamide, N-isopropoxymethyl (meth)acrylamide, N-n-butoxymethyl (meth)acrylamide, N-sec-butoxymethyl (meth)acrylamide, N-tert-butoxymethyl (meth)acrylamide; aromatic vinyl compound such as styrene, α-methylstyrene, vinyltoluene; benzyl (meth)acrylate, isobornyl (meth)acrylate, and (meth) acrylate having a nonionic polyoxyethylene constituent chain. The monomers described above can be used alone or in combination of two or more. In the present specification, "(meth)acrylate" means "acrylate" or "methacrylate".

Copolymer (a) can be obtained by copolymerizing the above described monomer constituents, for example, by radical copolymerization of the monomer constituents in an organic liquid in the presence of a polymerization initiator, and in the presence of a chain transfer agent, depending on the particular requirements of the method and materials used.

Polymerization initiators such as organic peroxides and azo compounds can be used. Examples of such organic peroxides can include benzoyl peroxide, t-butyl peroxyl 2-ethylhexanoate, di(t-butyl)peroxide, t-butyl peroxyl benzoate, and t-amyl peroxy 2-ethylhexanoate. Examples of azo compounds that can be used include azobisisobutyronitrile and azobisdimethylvaleronitrile. Examples of chain transfer agents that can be used include those described above as well as α-methylstyrene dimer, mercaptan.

Organic solvents that can be used for copolymerization to obtain copolymer (a) are preferably hydrophilic organic solvents. A wide variety of hydrophilic organic solvents can be used, including n-butanol, ethylene glycol monobutyl ether, ethylene glycol monoisopropyl ether, ethylene glycol monomethyl ether, propylene glycol monomethyl ether, and diethylene glycol monoethyl ether.

Amine-modified Epoxide Resin (b)

The amine-modified epoxide resins (b) that can be used in the manufacture of a resin composition of the present invention should be an addition product of a primary or secondary amine to an epoxide resin having a specified epoxy equivalent.

The epoxide resin having a specified epoxy equivalent described above can be an epoxide resin having a epoxy equivalent of about from 150 to 1,200, preferably about from 180 to 500, including bisphenol A type epoxide resins, bisphenol F type epoxide resins, and Novolak epoxide resins. Of these, bisphenol A type epoxide resins and bisphenol F type epoxide resins are preferable in view of their reactivity and compatibility with the copolymer (a) described above, and in view of the reduction in the amount of water used in producing a coating of the present invention with such epoxide resins.

The epoxide resins described above preferably have an epoxy equivalent in the area described above and a weight average molecular weight of about from 350 to 1,600, preferably about from 350 to 900. When such epoxide resins are used, the resulting coating composition yields more stable coatings.

A wide variety of primary or secondary amines can be used for the addition reaction with the epoxide resin to obtain the amine-modified epoxide resins (b), including such primary amines such as methylamine, ethylamine, n-propylamine, monoethanolamine; dimethylamine, diethylamine, methyl ethanolamine, ethyl ethanolamine, n-propyl ethanolamine, dodecyl ethanolamine, 2-methyl aminoethanol, 2-amino 2methyl propanol, diethanolamine, and diisopropanolamine. All of these primary amines are preferred because they are reducable in water. Of the above, primary amines or secondary amines which contain hydroxy groups are especially preferred.

The compounding ratio of the epoxide resin with the primary amine or secondary amine in the addition reaction described above is preferably about from 0.4 to 0.8 equivalent of activated hydrogen atom bonded to nitrogen atom of the amine based on 1 equivalent of epoxy group of the epoxy resin, in view of reactivity of quaternary salt-formation reaction with the copolymer (a), stability of the coating composition, water resistance, adhesion to a substrate, scratch resistance and fabricability of an obtained coating film.

Resin Composition for Water Borne Coatings

The resin composition of the present invention is a resin composition obtained by the reaction of copolymer (a) and amine-modified epoxide resin (b) in the presence of a tertiary amine. It is preferred that the reaction be of the quaternary salt-formation type. The compatibility of copolymer (a) with amine-modified epoxide resin (b), and their reducibility with water can be improved by the quaternary salt-formation reaction.

In the production of the resin composition for water borne coatings described above, it is preferable that the amount of the copolymer (a) be about from 50 to 90 parts by weight, preferably about from 60 to 80 parts by weight, and that the amount of the amine-modified epoxide resin (b) be about from 10 to 50 parts by weight, preferably about from 20 to 40 parts by weight. These preferred ratios will result in components and or a resulting composition that can be reduced in water, and will provide a composition that forms a coating that resists yellowing, scratches and retort, and is easy to fabricate and apply to a can or other substrate.

With regard to the reaction, the changing ratio to quaternary salts of the epoxy groups in the amine-modified epoxide resin (b) can be about from 60 to 80%, more preferably about from 65 to 78%. The preferred ration provides benefits in terms of viscosity and reducibility with water of the reaction product, and fabricability of the coating film obtained from the reaction product, as well as improved resistance to yellowing of the coating film in retort treatment. In the present invention, the changing ratio to quaternary salts means the ratio of the number of quaternary salts changed from the epoxy groups based on the total number of epoxy groups in the amine modified epoxide resin (b).

Water Borne Coating Composition

The water borne coating composition of the present invention contains the resin composition for water borne coatings described above as component (A) (hereinafter referred to as "resin composition (A)") and amino resin (B) as resin constituents, and the resin constituents are dissolved or dispersed stably in an aqueous medium.

Amino Resin

The amino resin which can be used as component (B) in the water borne coating composition of the present invention reacts with the resin composition (A) by heating, and crosslinks, and works as a crosslinking agent. Various amino resins can be used according to the present invention, including, for example, alkyletherified melamine resin such as methyletherified or butyletherified, and alkyletherified benzoguanamine resin. These and other amino resins can be used alone or in combination of two or more kinds thereof.

In the coating composition of the present invention, the compounding ratio of the resin composition (A) and the amino resin (B) can vary, but preferably the coating composition comprises about from 30 to 80 parts by weight, preferably about from 40 to 70 parts by weight, of the resin composition (A), and about from 20 to 70 part by weight, preferably about from 30 to 60 part by weight, of the amino resin (B). Both of the above rations are based on 100 parts by weight of the total solid content of the resin composition (A) and the amino resin (B), and have been found to provide superior qualities in the areas of fabricability and hardness and retort resistance of the resulting coating film.

The coating composition of the present invention can be obtained by dissolving or dispersing the resin composition (A) and the amino resin (B) in a stable aqueous medium. The producing method can vary widely and includes the following exemplary methods. The resin composition (A) can be neutralized by a base component, and dissolved or dispersed in an aqueous medium, and then, the amino resin (B) can be mixed in. Alternately, after mixing of the resin composition (A) and the amino resin (B), a base component can be added whereby the resin composition (A) is neutralized, and dissolved or dispersed in an aqueous medium. Another alternative method involves mixing the amino resin (B) with the neutralized product obtained by neutralization of the resin composition (A) by a base component, and then, the mixture is dissolved or dispersed in an aqueous medium.

In the above methods, a wide variety of base components can be employed for neutralization. Of these, amines having volatility, particularly, tertiary amines are preferably employed. Of the tertiary amines described above, triethylamine, triethanolamine, N,N-dimethylaminoethanol, N,Ndiethylaminoethanol, and morpholine are preferred. In general the neutralization equivalent of carboxyl groups by a base component is preferably about from 0.5 to 1.2, preferably about from 0.6 to 1.0.

The coating composition of the present invention comprises the resin composition (A) and an amino resin (B), and can also contain a neutralizer and aqueous medium, and may further contain a curing catalyst, odorant, reactive diluent, adhesion promoting agent, defoaming agent, and/or lubricant, depending on the particular requirements of the resulting coating or the substrate to be coated.

Curing catalysts that can be used include, for example, ptoluene sulfonic acid, dodecyl benzene sulfonic acid, dinonylnaphthalene sulfonic acid or amine-neutralized products of these acids. A wide variety if odorants that can be used, particularly for the purpose of masking the odor of amine and the like, peculiar to an aqueous composition.

The coating compositions of the present invention can have carboxyl groups in the copolymer (a), and furthermore, the copolymer (a) and the amine-modified epoxide resin (b) can be reacted by the quaternary salt formation reaction, so that compatibility between the copolymer (a) and the resin (b) is improved and reducibility with water is also improved. Therefore, the quantity of organic solvent can be reduced to make the composition a water borne coating composition. In the various resins and coating compositions of the present invention, it is possible to make the amount of organic solvent in the coating composition usually 10% by weight or less, preferably, 5% by weight or less in the coating composition. For example, in the coating composition which is a resin solution having a resin solid of 40%, it is possible to make the amount of organic solvent 25 parts by weight or less, preferably 12.5 parts by weight or less, and achieve low content of organic solvent.

A wide variety of substrates can be coated with the water borne coating composition of the present invention, but the substrate is preferably a metal substrate employed as a base material of a can, particularly cans made from aluminum, tinned iron, chromium plated tin-free steel metal. Typically, the substrate can be provided with a coated material on the metal described above and a printed material on the metal or the coated material described above. The shape of the substrate may be a molded can-shaped, or a sheet before formation-shaped. In addition, the substrate can be coated by many means including those that are known such as roll coating, a curtain flow coating, spray coating, electrostatic spray coating.

The water borne coating composition of the present invention can also be employed as a finish clear coating or a coating for a white coat which is applied to on an external surface of a can. When employed as a coating for a white coat, a white pigment such as titanium white can be added, depending on the requirements. Other pigments and pigment extenders can be added, including talc, calcium carbonate, or silica compounded as pigment. In the coating for a white coat, white pigment such as titanium white is usually compounded at the amount of 40–200 parts by weight based on 100 parts by weight of the resin solid.

The white coat of the present invention compounded with white pigment can be applied to an external surface of a molded can or a sheet surface that will become an external surface of a can, at a dry film thickness of about from 2 to 15 μm and can be baked, usually on the condition that the maximum temperature of the substrate be about from 140 to 260° C. for about from 10 seconds to 20 minutes to form a coating film of a white coat on an external surface of a can.

The finish clear coating of the present invention can be applied to an external surface of a can which is optionally formed with a white coat or printed with ink (an external surface of a molded can or a sheet surface to become an external surface of a can), at a dry film thickness of about form 2 to 15 μm and baked, usually on the condition that the maximum temperature of the substrate be about from 140 to 260° C. for about from 10 seconds to 20 minutes to form a finished clear coating film on a external surface of a can.

The water borne coating composition of the present invention can be preferably used as a finish clear coating or a coating for a white coat which can be applied to an external surface of a can, and can form a coating film superior in a smoothness, adhesion, fabricability, hardness, water resistance and retort resistance.

The water borne coating composition of the present invention wherein the resin composition for a water borne coatings of the present invention is used, can form a coating film having a good coating film property in smoothness of coated surface, surface appearance of gloss, adhesion, fabricability, hardness, yellowing resistance and retort resistance, and has good coatability, and has a low content of organic solvent.

The water borne coating composition of the present invention is preferably used as a coating for a white coat which is coated on an external surface of a can or a finish clear coating coated on a layer of printed ink optionally formed on the white coat, and is preferable from the viewpoint of earth atmosphere and ministry resources because of being water borne.

EXAMPLES

The various embodiments of the present invention are shown more specifically with reference to preparation examples, examples, comparative examples. "Parts" and 'W' are based on weight unless otherwise described.

Preparation of Copolymer

Preparation Example 1 n-Butanol (40.7 parts) was added to four-necked flask equipped with an agitator, a reflux condenser, thermometer, dropping funnel and nitrogen introduction mouth, and heated to 115° C. while introducing nitrogen gas, all while being stirred. Then a mixture of 33 parts of styrene, 33 parts of methyl methacrylate, 17.5 parts of 2-ethylhexyl methacrylate, 10 parts of 2-hydroxyethyl methacrylate, 6.5 parts of acrylic acid, 5 parts of α-methylstyrene dimmer, which is a chain transfer agent, and t-butyl peroxyl 2-ethyl hexanoate, which is a polymerization initiator, were added over the course of 3 hours from a dropping funnel. After addition of the mixture, it was held at the same temperature for one hour, and furthermore 8.5 parts of a solution obtained by dissolving 0.5 parts of t-butyl peroxyl 2-ethyl hexanoate in 8 parts of n-butanol was added over the course of 30 minutes. Then, after aging for 2 hours, 7.5 parts of n-butanol was added to give a copolymer solution (a-1) having about 60% solid content. The obtained copolymer has a resin acid value of 48 mgKOH/g, and number average molecular weight of 15,000.

Preparation Examples 2–6

Preparation of these examples was the same as that used in the preparation of Example 1, except that the composition of the mixture dropped from dropping funnel is shown in table 1, resulting in copolymer solutions (a-2)–(a-6) having 60% solid content. These examples also have a resin acid value and number average molecular weight as shown in table 1.

TABLE 1

| Preparation of Example No. | | 1 | 2 | 3 | 4 | 5 | 6 |
|---|---|---|---|---|---|---|---|
| Kind of Copolymer solution | | a-1 | a-2 | a-3 | a-4 | a-5 | a-6 |
| Mixture of monomer etc dropped from dropping funnel | Styrene | 33 | 28 | 33 | 32 | 35 | 29 |
| | Methyl methacrylate | 33 | 28 | 33 | 32 | 35 | 29 |
| | 2-Ethylhexyl methacrylate | 17.5 | 17.5 | 19 | 16 | 18 | 10 |
| | 2-Hydroxyethylhexy methacrylate | 10 | 20 | 10 | 10 | 10 | 10 |
| | Acrylic acid | 6.5 | 6.5 | 5 | 10 | 2 | 22 |
| | α-Methyl styrene dimmer | 5 | 5 | 5 | 5 | 5 | 5 |
| | t-Butylperoxy2-ethylhexanoate | 5.0 | 5.0 | 5.0 | 5.0 | 5.0 | 5.0 |
| Characteristic value of resin | Solid content (%) | 60 | 60 | 60 | 60 | 60 | 60 |
| | Acid value of resin solid (mgKOH/g) | 48 | 48 | 39 | 78 | 15 | 170 |
| | Number average molecular weight | 15,000 | 15,000 | 15,000 | 15,000 | 14,500 | 16,500 |

Preparation of Amine-modified Epoxide Resins

Preparation Example 7

157 parts of Epikote 828 EL (Trade name for bisphenol A type epoxide resin having an epoxy equivalent of about 190, from Yuka Shell Epoxy Co., Ltd.), and 120 parts of n-butanol were added to a four-necked flask equipped with an agitator, a reflux condenser, a thermometer, a dropping funnel and a nitrogen introduction mouth, and heated to 90° C. while being stirred. Then, a mixed solution of 61.9 parts of diethanolamine and 45.1 parts of n-butanol was dropped in over the course of 30 minutes. Then, the mixture was maintained at 90° C. for 3 hours, ensuring that the product (resin solid) has epoxy equivalent of 550 with titration method using hydrochloric acid and obtained an amine-modified epoxide resin solution of solid content 57% (b-1).

Preparation Example 8

157 parts of Epikote 834 (trade name for bisphenol A type epoxide resin having an epoxy equivalent of about 250, from Yuka Shell Epoxy Co.,Ltd.), and 120 parts of n-butanol were added to a four-necked flask equipped with an agitator, a reflux condenser, a thermometer, a dropping funnel and a nitrogen introduction mouth, and heated to 90° C. while being stirred. Then, a mixed solution of 49.1 parts of diethanolamine and 35.4 parts of nbutanol was dropped in over the course of 30 minutes. Then, the mixture was maintained at 90° C. for 3 hours, ensuring that the product (resin solid) has epoxy equivalent of 550 with titration method using hydrochloric acid, and obtained an amine-modified epoxide resin solution (b-2) of solid content 57%.

Preparation Example 9

121 parts of Epikote 828 EL (trade from Yuka Shell Epoxy Co.,Ltd.) and 36 parts of bisphenol A and 0.03 part of 50% aqueous solution of tetramethylammonium chloride were added to a four-necked flask equipped with an agitator, a reflux condenser, a thermometer, a dropping funnel and a nitrogen introduction mouth, and heated to 140° C., while introducing nitrogen gas and while stirring. Then, the mixture was maintained at 140° C. for 4 hours to obtain an epoxy resin having epoxy equivalent of 450–550. Then, the epoxy resin was diluted by 120 parts of n-butanol, and cooled off to 90° C. Then, a mixed solution of 23.7 parts of diethanolamine and 15 parts of n-butanol was dropped in over the course of 30 minutes. Then, the mixture was maintained at 90° C. for 3 hours, and it was ensured that the product (resin solid) has epoxy equivalent of 550 with titration method using hydrochloric acid, and obtained an amine-modified epoxide resin solution (b-3) having 57% solid content.

Preparation Examples 10–12

In Preparation Examples 10–12, the same method as Preparation Example 9 was followed except that the compounded amount of Epikote 828 EL and bisphenol A, and the kind and the compounded amount of an amine compound used for modifying, are described in Table 2, and the amount of n-butanol in the mixed solution of an amine compound and n-butanol was adjusted to become the solid content of the obtained an amine-modified epoxide resin solution 57%, to give amine-modified epoxide resin solutions (b-4)–(b-6) of solid content 57%.

TABLE 2

| Preparation Example No. | | 7 | 8 | 9 | 10 | 11 | 12 |
|---|---|---|---|---|---|---|---|
| Kind of amine-modified epoxide resin | | b-1 | b-2 | b-3 | b-4 | b-5 | b-6 |
| Epoxide | Epikote 828EL | 157.0 | | 121.0 | 109.4 | 121.0 | 103.2 |
| resin | Epikote 834 | | 157.0 | | | | |
| Bisphenol A | | | | 36.0 | 47.8 | 36.0 | 53.8 |
| Amine Compound | N-Methyl aminopropanol | | | | | 10.0 | |
| | Diethanol amine | 61.9 | 49.1 | 23.7 | 14.4 | | 5.7 |
| Solid content of resin solution (%) | | 57 | 57 | 57 | 57 | 57 | 57 |

Manufacture of Resin Compositions for Water Borne Coatings

Example 1

75 parts of copolymer solution (a-1) of 60% solid content as obtained in Preparation Example 1, 26.3 parts of the amine-modified epoxide resin solution (b-3) of 57% solid content as obtained in Preparation Example 9 and 2.10 parts of N,N-dimethyl ethanolamine were added to a four-necked flask equipped with an agitator, a reflux condenser, a thermometer, a dropping funnel and a nitrogen introduction mouth, and heated to 80° C., while stirring. Then, the mixture was maintained at 80° C. for 4 hours, and ensured that the product (resin solid) had acid value of 28 being end point, and added 1.33 parts of N,N-dimethyl ethanolamine and stirred for 5 minutes, and adjusted the solid content of the mixture to 40% by adding deionized water. The mixture was heated to 80° C. again, and the inner of the four-necked flask was depressurized, and solvent in the mixture was removed, and then, deionized water and n-butanol were added into the flask to obtain resin composition (A-1) for water borne coatings, the resin composition (A-1) having an organic solvent-content of 5% and a solid content of 50%.

Examples 2–10 and Comparative Examples 1–6

In these examples and comparative examples, the same method of operations as that used in obtaining Example 1 were used, except that the compounded composition of acrylic resin, amine modified epoxide resin and tertiary amine was as shown in Table 3, wherein each resin composition for water borne coatings obtained had an organic solvent-content of 5% and a solid content of 50%.

TABLE 3

| Example No. | | 1 | 2 | 3 | 4 | 5 | 6 | 7 | 8 |
|---|---|---|---|---|---|---|---|---|---|
| Kind of resin solution | | A-1 | A-2 | A-3 | A-4 | A-5 | A-6 | A-7 | A-8 |
| Copolymer solution | a-1 | 75 | | 75 | 75 | 75 | | | 75 |
| | a-2 | | 75 | | | | | | |
| | a-3 | | | | | | 75 | | |
| | a-4 | | | | | | | 75 | |
| | a-5 | | | | | | | | |
| | a-6 | | | | | | | | |
| Solution of amine-modified epoxide resin | b-1 | | | 26.3 | | | | | |
| | b-2 | | | | 26.3 | | | | |
| | b-3 | 26.3 | 26.3 | | | | 26.3 | 26.3 | |
| | b-4 | | | | | 26.3 | | | |
| | b-5 | | | | | | | | 26.3 |
| | b-6 | | | | | | | | |
| 2-(Dimethyl amino)ethanol | For formation of quaternary | 2.10 | 2.10 | 2.14 | 2.40 | 1.05 | 2.10 | 2.10 | 2.10 |

TABLE 3-continued

| | | | | | | | | | |
|---|---|---|---|---|---|---|---|---|---|
| | salt | | | | | | | | |
| | For neutralizing | 1.33 | 1.33 | 1.29 | 1.03 | 2.3 | 0.69 | 3.47 | 1.33 |
| Changing ratio to quaternary salt in epoxy groups of amine-modified epoxide resin (b) (%) | | 72 | 74 | 75 | 72 | 70 | 72 | 73 | 76 |

| | | | | | | | | | |
|---|---|---|---|---|---|---|---|---|---|
| Example No. | | 9 | 10 | 1 | 2 | 3 | 4 | 5 | 6 |
| Kind of resin solution | | A-9 | A-10 | AC-1 | AC-2 | AC-3 | AC-4 | AC-5 | AC-6 |
| Copolymer solution | a-1 | 85 | 55 | | | 75 | 40 | 95 | 75 |
| | a-2 | | 75 | | | | | | |
| | a-3 | | | | | | 75 | | |
| | a-4 | | | | | | | 75 | |
| | a-5 | | | 75 | | | | | |
| | a-6 | | | | 75 | | | | |
| Solution of amine-modified epoxide resin | b-1 | | | 26.3 | | | | | |
| | b-2 | | | | 26.3 | | | | |
| | b-3 | 15.8 | 47.4 | 26.3 | 26.3 | | 63.2 | 5.3 | 26.3 |
| | b-4 | | | | | | | | |
| | b-5 | | | | | 26.3 | | | |
| | b-6 | | | | | | | | |
| 2-(Dimethylamino)ethanol | For formation of quaternary salt | 1.26 | 1.51 | 0.84 | 2.1 | 0.52 | 1.61 | 0.42 | |
| | For neutralizing | 2.62 | 1.01 | 0.23 | 11.8 | 2.91 | 0.22 | 3.92 | 3.43 |
| Changing ratio to quaternary salt in epoxy groups of amine-modified epoxide resin (b) (%) | | 69 | 71 | 52 | 85 | 75 | 65 | 67 | — |

Examples 11–22 and Comparative Examples 7–14

The resin compositions for water borne coatings obtained in Examples 1 to 10 and Comparative Examples 1 to 6, ethylene glycol monobutyl ether, "Nikalack SB-355" (made by Sanwa Chemical Co., Ltd., isopropanol solution of methyl etherified and butyl etherified benzoguanamine resin, solid content of 75%) and deionized water were used, and mixed with the compounded composition shown in postscript table 4 to give each water-borne clear coating.

Examples 23–24 and Comparative Examples 15–22

In according to the compounded composition shown in postscript table 5, the resin compositions for water borne coatings obtained in Examples 1 to 10 and Comparative Examples 1 to 6, ethylene glycol monobutyl ether, "Nikalack BX-400" (made by Sanwa Chemical Co., Ltd., methyl etherified and butyl etherified benzoguanamine resin, solid content of 100%, liquid resin) and deionized water were mixed. Into the mixture, "Tipaque CR-95" (made in Ishihara Sangyo Co., Ltd., titanium white pigment) is added and mixed sufficiently, further was added "NACURE5225" (made by King Industries, Company, in U.S.A., a solution of amine-blocked dodecylbenzene sulphonic acid, curing catalyst) to give each water-borne white coating.

Preparation of Test Panel (1) Test panel having clear coating film: Each water-borne clear coating obtained in Example 11–22 and Comparative Example 714 was coated by a roll coat method to be a dry film thickness of 5 µm on an aluminum plate of 0.26 mm thickness, and baked for 120 seconds so that temperature of the aluminum plate was held at 200° C. for 90 seconds, in a gas conveyer oven to give each test panel having clear coating film.

(2) Test panel having white coating film: Each water-borne white coating obtained in Example 23–34 and Comparative Example 15–22 was coated by a roll coat method to be a dry film thickness of 7 µm on an aluminum plate of 0.26 mm thickness, and baked for 120 seconds so that temperature of the aluminum plate was held at 200° C. for 90 seconds, in a gas conveyer oven to give each test panel having white coating film.

Coating condition of each water-borne clear coating obtained in Example 11–22 and Comparative Example 7–14 and each water-borne white coating obtained in Example 23–34 and Comparative Example 15–22, and coating film property of the test panel described above were examined in according to the postscript test method. The test results were shown in postscript table 4 and 5.

Test Methods

Coating Condition

Coating condition of coating compositions which were stored in sealing up condition, at 20° C. for one month from just after coating manufacture, was observed. In water-borne clear coatings, transparency of coating, and presence of isolation and settlement were observed. In water-borne white coatings, isolation and settlement of the coatings in which titanium white pigment was included, were observed. Nothing abnormal is recognized in the above item is shown with ◯ (good). (*1) shows "turbid to white", and (*2) shows "isolation was observed."

Adhesion

The adhesion test was carried out by the cross cut tape test method under JIS K 5400 8.5.2 (1990). The coating film of each test panel was crosswise cut to reach the aluminum plate to form 100 squares (1 mm×1 mm each). Then cellophane adhesive tape was adhered to the cut surface and rapidly peeled off. The adhesion was evaluated depending on the degree of peeling and evaluated by the following standards. ○: Peeling of coat is not recognized at all. Δ: Peeling of coat is recognized a little. ×: Peeling of coat is recognized remarkably.

Pencil hardness

Pencil scratch test provided in JIS K 5400 8.4.2 (1990) was carried out to the coating film of the test panel both in a room of 20 r and in a hot water of 80* C by means of Mitsubishi Uni pencil (made by Mitsubishi Pencil Co., Ltd.) It was evaluated by a breaking method.

Retort resistance

Test panels were immersed in a deionized water and subject to steam treatment at pressurized condition at 125 C. for 30 minutes in an autoclave (retort treatment), and then the coating films after retort treatment, were examined about adhesion and whitening by visual observation. The test and evaluation of adhesion were carried out by the same method as the adhesion test described before. The state of whitening of coating film was evaluated with the following standards:

○: Whitening is not recognized on the coating film. Δ: Whitening is recognized a little on the coating film. ×: Whitening is recognized remarkably on the coating film.

Impact Processibility

In accordance with JIS K 5400 8.3.2 (1990) DuPont impact resistance test, a coating film on a test panel was hit from the backside under the condition of diameter of impact point: ⅜ inches (9.52 mm), falling weight load: 300 g, falling height: 20 cm. Then, the processed test panel was immersed in deionized water and subject to a steam treatment at pressurized condition at 1251 C. for 30 minutes in an autoclave (retort treatment), and cracking of the coating film after retort treatment was evaluated with the following standards: ○: Cracking of coating film is not recognized. Δ: Cracking of coating film is recognized a little. ×: Cracking of coating film is recognized remarkably.

TABLE 4

| | | | Example | | | | | | | | | |
|---|---|---|---|---|---|---|---|---|---|---|---|---|
| Example No. | | | 11 | 12 | 13 | 14 | 15 | 16 | 17 | 18 | 19 | 20 |
| Resin composition for water borne coatings | Kind | | A-1 | A-2 | A-3 | A-4 | A-5 | A-6 | A-7 | A-8 | A-9 | A-10 |
| | Amount (part) | | 42 | 42 | 42 | 42 | 42 | 42 | 42 | 42 | 42 | 42 |
| Nikalack SB-355 | | | 18.7 | 18.7 | 18.7 | 18.7 | 18.7 | 18.7 | 18.7 | 18.7 | 18.7 | 18.7 |
| Ethyleneglycol monobutyl ether | | | | | | | | | | | | |
| Deionized water | | | 39.3 | 39.3 | 39.3 | 39.3 | 39.3 | 39.3 | 39.3 | 39.3 | 39.3 | 39.3 |
| Total amount | | | 100 | 100 | 100 | 100 | 100 | 100 | 100 | 100 | 100 | 100 |
| Organic solvent content in coating composition (%) | | | 6.8 | 6.8 | 6.8 | 6.8 | 6.8 | 6.8 | 6.8 | 6.8 | 6.8 | 6.8 |
| Test result | Coating condition | Initial | ○ | ○ | ○ | ○ | ○ | ○ | ○ | ○ | ○ | ○ |
| | | After 1 month stored | ○ | ○ | ○ | ○ | ○ | ○ | ○ | ○ | ○ | ○ |
| | Adhesion | | ○ | ○ | ○ | ○ | ○ | ○ | ○ | ○ | ○ | ○ |
| | Pencil hardness | In a room at 20° C. | 3H | 4H | 3H | 3H | 3H | 3H | 4H | 3H | 3H | 3H |
| | | In a hot water of 80° C. | H | 2H | F | F | H | F | H | F | HB | 2H |
| | Retort resistance | Adhesion | ○ | ○ | ○ | ○ | ○ | ○ | ○ | ○ | ○ | ○ |
| | | Whitening of coating film | ○ | ○ | ○ | ○ | ○ | ○ | ○ | ○ | ○ | ○ |
| | Impact processibility | | ○ | ○ | ○ | ○ | ○ | ○ | ○ | ○ | ○ | ○ |

| | | | Example | | | | | | | | | |
|---|---|---|---|---|---|---|---|---|---|---|---|---|
| Example No. | | | 21 | 22 | 7 | 8 | 9 | 10 | 11 | 12 | 13 | 14 |
| Resin composition for water borne coatings | Kind | | A-1 | A-2 | AC-1 | AC-2 | AC-3 | AC-4 | AC-5 | AC-6 | A-1 | A-1 |
| | Amount (part) | | 56.0 | 31.5 | 42.0 | 42.0 | 42.0 | 42.0 | 42.0 | 42.0 | 66.5 | 21.0 |
| Nikalack SB-355 | | | 9.3 | 25.7 | 18.7 | 18.7 | 18.7 | 18.7 | 18.7 | 18.7 | 2.3 | 32.7 |
| Ethyleneglycol monobutyl ether | | | 1.7 | | | | | | | | 2.9 | |
| Deionized water | | | 33.0 | 39.3 | 39.3 | 39.3 | 39.3 | 39.3 | 39.3 | 39.3 | 28.3 | 46.3 |
| Total amount | | | 100.0 | 100.0 | 100.0 | 100.0 | 100.0 | 100.0 | 100.0 | 100.0 | 100.0 | 100.0 |
| Organic solvent content in coating composition (%) | | | 6.8 | 8.0 | 6.8 | 6.8 | 6.8 | 6.8 | 6.8 | 6.8 | 6.8 | 9.3 |
| Test result | Coating condition | Initial | ○ | ○ | *1 | ○ | *2 | *1 | ○ | *1 | ○ | *1 |
| | | After 1 month stored | ○ | ○ | *2 | ○ | — | *2 | ○ | *2 | ○ | *2 |
| | Adhesion | | ○ | ○ | Δ | — | ○ | ○ | ○ | ○ | ○ | ○ |
| | Pencil hardness | In a room at 20° C. | 3H | 4H | 2H | 4H | — | 2H | 3H | 3H | 2H | 4H |
| | | In a hot water of 80° C. | HB | 2H | B | H | — | 2B | HB | HB | 4B | 3H |
| | Retort resistance | Adhesion | ○ | ○ | Δ | × | — | ○ | ○ | ○ | ○ | Δ |
| | | Whitening of coating film | ○ | ○ | Δ | × | — | Δ | Δ | Δ | × | Δ |
| | Impact processibility | | ○ | ○ | ○ | Δ | — | Δ | × | Δ | ○ | × |

TABLE 5

|  |  | Example |  |  |  |  |  |  |  |  |  |
|---|---|---|---|---|---|---|---|---|---|---|---|
| Example No. | | 23 | 24 | 25 | 26 | 27 | 28 | 29 | 30 | 31 | 32 |
| Resin composition for water borne coatings | Kind | A-1 | A-2 | A-3 | A-4 | A-5 | A-6 | A-7 | A-8 | A-9 | A-10 |
| | Amount (part) | 38.0 | 38.0 | 38.0 | 38.0 | 38.0 | 38.0 | 38.0 | 38.0 | 38.0 | 38.0 |
| Nikalack BX-4000 | | 8.1 | 8.1 | 8.1 | 8.1 | 8.1 | 8.1 | 8.1 | 8.1 | 8.1 | 8.1 |
| Ethyleneglycol monobutyl ether | | 2.7 | 2.7 | 2.7 | 2.7 | 2.7 | 2.7 | 2.7 | 2.7 | 2.7 | 2.7 |
| Tipaque CR95 | | 37.9 | 37.9 | 37.9 | 37.9 | 37.9 | 37.9 | 37.9 | 37.9 | 37.9 | 37.9 |
| NACURE 5225 | | 0.5 | 0.5 | 0.5 | 0.5 | 0.5 | 0.5 | 0.5 | 0.5 | 0.5 | 0.5 |
| Deionized water | | 12.8 | 12.8 | 12.8 | 12.8 | 12.8 | 12.8 | 12.8 | 12.8 | 12.8 | 12.8 |
| Total amount | | 100.0 | 100.0 | 100.0 | 100.0 | 100.0 | 100.0 | 100.0 | 100.0 | 100.0 | 100.0 |
| Organic solvent content in coating composition (%) | | 5.0 | 5.0 | 5.0 | 5.0 | 5.0 | 5.0 | 5.0 | 5.0 | 5.0 | 5.0 |
| Test result | Coating condition | Initial | ○ | ○ | ○ | ○ | ○ | ○ | ○ | ○ | ○ | ○ |
| | | After 1 month stored | ○ | ○ | ○ | ○ | ○ | ○ | ○ | ○ | ○ | ○ |
| | Adhesion | | ○ | ○ | ○ | ○ | ○ | ○ | ○ | ○ | ○ | ○ |
| | Pencil hardness | In a room at 20° C. | 3H | 3H | 3H | 3H | 3H | 3H | 3H | 3H | 3H | 3H |
| | | In a hot water of 80° C. | F | H | HB | HB | F | HB | H | F | HB | HB |
| | Retort resistance | Adhesion | ○ | ○ | ○ | ○ | ○ | ○ | ○ | ○ | ○ | ○ |
| | | Whitening of coating film | ○ | ○ | ○ | ○ | ○ | ○ | ○ | ○ | ○ | ○ |
| | Impact processibility | | ○ | ○ | ○ | ○ | ○ | ○ | ○ | ○ | ○ | ○ |

|  |  | Example |  |  |  |  |  |  |  |  |  |
|---|---|---|---|---|---|---|---|---|---|---|---|
| Example No. | | 33 | 34 | 15 | 16 | 17 | 18 | 19 | 20 | 21 | 22 |
| Resin compositions for water borne coatings | Kind | A-1 | A-2 | AC-1 | AC-2 | AC-3 | AC-4 | AC-5 | AC-6 | A-1 | A-1 |
| | Amount (part) | 46.1 | 27.1 | 38.0 | 38.0 | 38.0 | 38.0 | 38.0 | 38.0 | 51.5 | 16.3 |
| Nikalack BX-4000 | | 4.1 | 13.6 | 8.1 | 8.1 | 8.1 | 8.1 | 8.1 | 8.1 | 1.4 | 19.0 |
| Ethyleneglycol monobutyl ether | | 2.3 | 3.3 | 2.7 | 2.7 | 2.7 | 2.7 | 2.7 | 2.7 | 2.0 | 3.8 |
| Tipaque CR95 | | 37.9 | 37.9 | 37.9 | 37.9 | 37.9 | 37.9 | 37.9 | 37.9 | 37.9 | 37.9 |
| NACURE 5225 | | 0.5 | 0.5 | 0.5 | 0.5 | 0.5 | 0.5 | 0.5 | 0.5 | 0.5 | 0.5 |
| Deionized water | | 9.1 | 17.6 | 12.8 | 12.8 | 12.8 | 12.8 | 12.8 | 12.8 | 6.7 | 22.5 |
| Total amount | | 100 | 100 | 100 | 100 | 100 | 100 | 100 | 100 | 100 | 100 |
| Organic solvent content in coating composition (%) | | 5.0 | 5.0 | 5.0 | 5.0 | 5.0 | 5.0 | 5.0 | 5.0 | 5.0 | 5.0 |
| Test result | Coating condition | Initial | ○ | ○ | *2 | ○ | *2 | *2 | ○ | *2 | ○ | *2 |
| | | After 1 month stored | ○ | ○ | — | ○ | — | — | ○ | — | ○ | — |
| | Adhesion | | ○ | ○ | — | ○ | — | — | ○ | — | ○ | — |
| | Pencil hardness | In a room at 20° C. | 3H | 3H | — | 4H | — | — | 3H | — | 2H | — |
| | | In a hot water of 80° C. | B | 2H | — | 2H | — | — | 2B | — | 4B | — |
| | Retort resistance | Adhesion | ○ | ○ | — | Δ | — | — | ○ | — | ○ | — |
| | | Whitening of coating film | ○ | ○ | — | X | — | — | Δ | — | X | — |
| | Impact processibility | | ○ | ○ | — | Δ | — | — | Δ | — | Δ | — |

We claim:

1. A resin composition, which is the quaternary salt-formation reaction product, in the presence of a tertiary amine, of (a) about from 50 to 90 parts by weight of a copolymer having an acid value of about from 20 to 160 mgKOH/g and (b) about from 10 to 50 parts by weight of an amine-modified epoxide resin.

2. A resin composition of claim 1 comprising about from 60 to 80 parts by weight of the copolymer and about from 20 to 40 parts by weight of the amine-modified epoxide resin.

3. A resin composition of claim 1 wherein the amine-modified epoxide resin (b) is an addition reaction product of a primary or secondary amine and an epoxy resin having an epoxy equivalent of about from 150 to 1,200.

4. A resin composition of claim 3 wherein the amine-modified epoxide resin has an epoxy equivalent of about from 180 to 500.

5. A resin composition of claim 3 wherein the amine-modified epoxide resin has a weight average molecular weight of about from 350 to 1,600.

6. A resin composition of claim 5 wherein the amine-modified epoxide resin has a weight average molecular weight of about from 350 to 900.

7. A resin composition of claim 3 wherein the amine-modified epoxide resin (b) is an addition reaction product and the addition reaction is carried out with the ratio of about from 0.4 to 0.8 equivalent of active hydrogen on nitrogen atom in amine, based on 1 equivalent of epoxy group in epoxide resin.

8. A resin composition of claim 1 wherein the copolymer (a) is the copolymerization product of at least one α, β-ethylenically unsaturated carboxylic acid and at least one radically polymerizable unsaturated monomer, the unsaturated monomer being copolymerizable with the at least one unsaturated carboxylic acid.

9. A resin composition of claim 8 wherein the copolymer (a) comprises about from 2.5 to 20% by weight of the at least one unsaturated carboxylic acid.

10. A resin composition of claim 9 wherein the copolymer (a) comprises about from 5 to 15% by weight of the at least one unsaturated carboxylic acid.

11. A resin composition of claim 1 wherein the copolymer (a) has a number average molecular weight of about from 8,000 to 25,000.

12. A resin composition of claim 11 wherein the copolymer (a) has a number average molecular weight of about from 10,000 to 20,000.

13. A resin composition of claim 1 wherein the copolymer (a) has an acid value of about from 40 to 120 mgKOH/g.

14. A resin composition of claim 1 wherein the ratio of quaternary salt-formation based on the epoxy group in amine-modified epoxide resin (b) is about from 60 to 80%.

15. A resin composition of claim 14 wherein the ratio of quaternary salt-formation based on the epoxy group in amine-modified epoxide resin (b) is about from 65 to 78%.

16. A water-borne coating composition comprising (A) a resin composition of claim 1 and (B) at least one amino resin, both being dissolved or dispersed in a stable aqueous medium.

17. A coating composition of claim 16 comprising about from 40 to 90 parts by weight of the resin composition (A), and about from 10 to 60 parts by weight of at least one amino resin (B), based on 100 parts by weight of the total solid of the resin composition (A) and the amino resin (B).

18. A coating composition of claim 16 comprising about from 30 to 80 parts by weight of the resin composition (A), and about from 20 to 70 parts by weight of the at least one amino resin (B), based on 100 parts by weight of the total solid of the resin composition (A) and the amino resin (B).

19. A coating composition of claim 18 comprising about from 30 to 80 parts by weight of the resin composition (A), and about from 30 to 60 parts by weight of the at least one amino resin (B), based on 100 parts by weight of the total solid of the resin composition (A) and the amino resin (B).

20. A coating composition of claim 16 further comprising a white pigment.

21. A method of forming a coating film comprising applying the water-borne coating composition of claim 16 onto a substrate.

22. A substrate coated with the coating composition of claim 16.

* * * * *